(12) United States Patent
Inoue et al.

(10) Patent No.: US 6,692,860 B2
(45) Date of Patent: Feb. 17, 2004

(54) FUEL CELL COMPRISING DUAL SEAL ASSEMBLY

(75) Inventors: Masajiro Inoue, Wako (JP); Nobuaki Kimura, Wako (JP); Narutoshi Sugita, Wako (JP); Hideaki Kikuchi, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 445 days.

(21) Appl. No.: 09/844,973

(22) Filed: Apr. 27, 2001

(65) Prior Publication Data

US 2001/0051294 A1 Dec. 13, 2001

(30) Foreign Application Priority Data

May 2, 2000 (JP) .................................... P2000-133863
Mar. 26, 2001 (JP) .................................... P2001-088555

(51) Int. Cl.⁷ ................................................ H01M 2/08
(52) U.S. Cl. .......................................... 429/35; 429/36
(58) Field of Search ............................ 429/34, 35, 36, 429/37

(56) References Cited

U.S. PATENT DOCUMENTS 4,510,213 A  4/1985  Schnacke ..................... 429/36
5,464,700 A  11/1995  Steck et al. .................. 429/30

FOREIGN PATENT DOCUMENTS

JP  08-148169  6/1996

*Primary Examiner*—Randy Gulakowski
*Assistant Examiner*—M. Wills
(74) *Attorney, Agent, or Firm*—Lahive & Cockfield, LLP

(57) ABSTRACT

A fuel cell includes a membrane electrode assembly having a solid polymer electrolyte membrane, an anode side diffusion electrode and a cathode side diffusion electrode located at both sides of the solid polymer electrolyte membrane, and a pair of separators which holds the membrane electrode assembly. The fuel cell also includes a first seal and a second seal. The first seal is disposed between one of the separators and a periphery portion of whichever of the anode side diffusion electrode and the cathode side diffusion electrode has the larger surface area so as to surround whichever of the anode side diffusion electrode and the cathode side diffusion electrode has the smaller surface area. The second seal is disposed between the separators so as to surround whichever of the anode side diffusion electrode and the cathode side diffusion electrode has the larger surface area.

16 Claims, 9 Drawing Sheets

FUEL CELL COMPRISING DUAL SEAL ASSEMBLY

RELATED APPLICATIONS

This application claims priority to Japanese Patent Application No. P2000-133863 filed May 2, 2000 in Japan and Japanese Patent Application No. P2001-088555 filed Mar. 26, 2001 in Japan. The contents of the aforementioned applications are hereby incorporated by reference.

BACKGROUND OF THE INVENTION

1. Field of the Invention

The present invention relates to a fuel cell. More specifically, the present invention relates to a fuel cell assembled such that a membrane electrode assembly, which is formed by a solid polymer electrolyte membrane and an anode side gas diffusion electrode and a cathode side gas diffusion electrode, is held by a pair of separators. Especially, the present invention relates to a fuel cell in which the membrane electrode assembly is sealed with certainty between the separators.

2. Description of Related Art

In conventional fuel cells, the membrane electrode assembly comprises a solid polymer electrolyte membrane, and an anode side diffusion electrode and a cathode side diffusion electrode which are located at both sides of the membrane. The membrane electrode assembly is held by a pair of separators. By supplying fuel gas (for example, hydrogen gas) onto a reaction surface of the anode side diffusion electrode, the hydrogen gas becomes ionized, and moves toward the cathode side diffusion electrode through the solid polymer electrolyte membrane. The electrons produced in this process flow through an external circuit, and can provide electric energy in the form of a direct current. Since an oxidizing gas (for example, air which contains oxygen) is supplied to the anode electrode, water is generated by the reaction of the hydrogen ions, the electrons, and the oxygen.

One example of a conventional fuel cell is explained with reference to FIG. 20. In FIG. 20, reference numeral 1 denotes the solid polymer electrolyte membrane. A fuel cell 4 is assembled such that the solid polymer electrolyte membrane 1 is held between gas diffusion electrodes (an anode side diffusion electrode and a cathode side diffusion electrode) 2 and 3. A pair of separators 5 is provided so as to sandwich the fuel cell, and an O-ring 7 is fit to a groove portion 6 formed on each of the separators 5. Thus, the solid polymer electrolyte membrane 1 is held by the O-ring 7 and, in that state, the fuel cell 4 is held between the separators 5 (refer to Japanese Unexamined Patent Application, First Publication No. Hei 8-148169).

In the above conventional fuel cell, the O-ring 7 separates the spaces between the separators 5 and the gas diffusion electrodes 2 and 3 from the outside. Therefore, this fuel cell advantageously prevents the leakage of the fuel gas and the oxidant gas, and prevents the mixing of those gases, to thereby achieve efficient electric power generation. However, even a slight shift in the position of the O-ring 7 may result in an insufficient seal reaction force and deteriorate the sealing property thereof. Also, if the solid polymer electrolyte membrane is pulled in the vertical direction in FIG. 20 and twisted due to the above-mentioned shift in the position of the O-ring 7, a force separating the solid polymer electrolyte membrane 1 and the gas diffusion electrodes 2 and 3 may be generated and this phenomenon is not preferable.

In order to avoid the above-mentioned problem, it is necessary to strictly control the accuracy of the size of the groove portion 6. However, this leads to an increase in the manufacturing cost.

Accordingly, an object of the invention is to provide a fuel cell having an improved sealing property between the membrane electrode assembly and the separators, which may be produced readily at a reasonable manufacturing cost.

SUMMARY OF THE INVENTION

Accordingly, one of the objectives of the present invention is to provide a fuel cell including a membrane electrode assembly having a solid polymer electrolyte membrane (for instance, a solid polymer electrolyte membrane 18 in the embodiments), an anode side diffusion electrode (for instance, the combination of an anode electrode 22 and a second gas diffusion layer 26 in the embodiments) and a cathode side diffusion electrode (for instance, the combination of a cathode electrode 20 and a first gas diffusion layer 24 in the embodiments) located at both sides of the solid polymer electrolyte membrane, and a pair of separators (for instance, a first separator 14 and a second separator 16 in the embodiments) which holds the membrane electrode assembly. The fuel cell further includes a first seal (for instance, a first seal S1 in the embodiments) substantially disposed between one of the separators and a periphery portion of whichever of the anode side diffusion electrode and the cathode side diffusion electrode has the larger surface area, the first seal being disposed so as to surround whichever of the anode side diffusion electrode and the cathode side diffusion electrode has the smaller surface area; and a second seal (for instance, a second seal S2 in the embodiments) substantially disposed between the separators so as to surround whichever of the anode side diffusion electrode and the cathode side diffusion electrode has the larger surface area.

According to the above fuel cell, the first seal and the second seal may function independently of each other. Thus, problems such as deficiencies in the sealing force caused by a positional shift of the seals may be eliminated and, hence, the seal seals the membrane electrode assembly and the separators with certainty. Also, although it is possible to use only members made of the same kind of material in order to equalize the reaction force for the cases where the seals are disposed so as to oppose each other, such an effect of the reaction force need not be considered according to the present invention and the material to be used may be freely selected.

In accordance with another aspect of the invention, the size of the solid polymer electrolyte membrane is smaller than the size of whichever of the anode side diffusion electrode and the cathode side diffusion electrode has the larger surface area.

According to the above fuel cell, since the size of the solid polymer electrolyte membrane, which is expensive, is decreased, it becomes possible to reduce the cost of the solid polymer electrolyte membrane and the fuel cell per se.

In yet another aspect of the invention, at least one of the first seal and the second seal makes contact with an end face of the anode side diffusion electrode or an end face of the cathode side diffusion electrode.

According to the above fuel cell, since at least one of the first seal and the second seal makes contact with an end face of the anode side diffusion electrode or an end face of the cathode side diffusion electrode, it becomes possible to prevent a reaction gas from leaking out of the end face and from passing through to the outlet side without making contact with the electrically active surface. Accordingly, the seal of the fuel cell may further be improved.

In yet another aspect of the invention, the first seal makes contact with an end face of whichever of the anode side diffusion electrode and the cathode side diffusion electrode has the smaller surface area; and the first seal being extended so as to cover whichever of the anode side diffusion electrode and the cathode side diffusion electrode has the larger surface area.

According to the above fuel cell, the first seal prevents the reaction gas from leaking out of the end face. Also, since no space is present between the first seal and the second seal, it becomes possible to prevent the reaction gas from passing through to the outlet side without making contact with the electrically active surface. Accordingly, the sealing property of fuel cell may further be improved, and unnecessary pressure is not applied to a sealed portion by an expansion/contraction of the space between the end face and the seal due to changes in temperature.

In yet another aspect of the invention, the second seal makes contact with both an end face of the first seal and an end face of whichever of the anode side diffusion electrode and the cathode side diffusion electrode has the larger surface area.

According to the above fuel cell, since the first seal and the second seal prevent the reaction gas from leaking out of both of the end faces, it becomes possible to prevent the reaction gas from passing through to the outlet side without making contact with the electrically active surface. Accordingly, the sealing property of fuel cell may further be improved.

In yet another aspect of the invention, the size of the solid polymer electrolyte membrane and the size of whichever of the anode side diffusion electrode and the cathode side diffusion electrode has the larger surface area are substantially the same.

According to the above fuel cell, the solid polymer electrolyte membrane and whichever of the anode side diffusion electrode and the cathode side diffusion electrode has the larger surface area may be assembled first and then the edge portions thereof may be cut to be flush to each other. Thus, the fuel cell may be readily manufactured.

In yet another aspect of the invention, the anode side diffusion electrode includes an anode electrode, which is a catalyst portion, and a diffusion layer; and the cathode side diffusion electrode includes a cathode electrode, which is a catalyst portion, and a diffusion layer, wherein the size of the catalyst portion of the anode side diffusion electrode and the size of the catalyst portion of the cathode side diffusion electrode are substantially the same.

According to the above fuel cell, since the amount of the catalyst portion, which is expensive, may be decreased, it becomes possible to reduce the manufacturing costs.

In yet another aspect of the invention, the separators are made of dense carbon or a thin metal plate (for instance, a first separator 114 and a second separator 116 in the embodiments).

According to the above fuel cell, for the case where the separators are made of a thin metal plate, they may be produced easily by using a press molding method. Therefore, the manufacturing cost thereof may be reduced and the productivity may be increased.

In yet another aspect of the invention, the first seal (for instance, a first seal S11 in the embodiments) and the second seal (for instance, a second seal S12 in the embodiments) are provided with the same separator.

According to the above fuel cell, since both of the seals may be produced in one process, the number of manufacturing steps may be decreased.

In yet another aspect of the invention, each of the first seal and the second seal is provided with a different separator.

According to the above fuel cell, seals made of different materials may be used for each of the separators which may be made of a metal. Accordingly, the design range of the seals as well as the separators may be widened.

The present invention also provides a fuel cell including a membrane electrode assembly having a solid polymer electrolyte membrane, an anode side diffusion electrode and a cathode side diffusion electrode located at both sides of the solid polymer electrolyte membrane, and a pair of separators which holds the membrane electrode assembly. The fuel cell further includes a first seal substantially disposed between one of the pair of separators and the membrane electrode assembly, and a second seal substantially disposed between the pair of separators so as to be shifted in position outwardly with respect to the position of the first seal to form a double seal together with the first seal.

According to the above fuel cell, a double sealing effect may be obtained with respect to the reaction gas inside the first seal and, hence, safety may be improved by reducing the chance of leakage of the reaction gas.

The present invention also provides a fuel cell including a membrane electrode assembly having a solid polymer electrolyte membrane, an anode side diffusion electrode and a cathode side diffusion electrode each located on a different side of the solid polymer electrolyte membrane, and a pair of separators which holds the membrane electrode assembly. The fuel cell further includes a groove portion provided with the anode side diffusion electrode or the cathode side diffusion electrode, the groove portion being so formed to expose the solid polymer electrolyte membrane, a first seal provided with one of the separators, the first seal being inserted into the groove portion so as to make contact with the solid polymer electrolyte membrane, and a second seal provided with one of the separators, the second seal being shifted in position outwardly with respect to the position of the first seal and making contact with the other one of the separators.

In yet another aspect of the invention, the anode side diffusion electrode and the cathode side diffusion electrode of the above fuel cell are of the same size.

According to the above fuel cell, since the front face of the solid polymer electrolyte membrane may be compressed from both sides, it becomes possible to prevent the generation of cracks in the solid polymer electrolyte membrane even if the water content of the membrane is changed and the membrane is expanded/contracted.

In yet another aspect of the invention, the first seal and the second seal of the above fuel cell are provided with the same separator.

According to the above fuel cell, since both of the seals may be produced in one process, the number of manufacturing steps may be decreased.

In yet another aspect of the invention, each of the first seal and the second seal of the above fuel cell is provided with a different separator.

According to the above fuel cell, seals made of different materials may be used for each of the separators which may be made of a metal. Accordingly, the design range of the seals as well as the separators may be widened.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Figure 1:
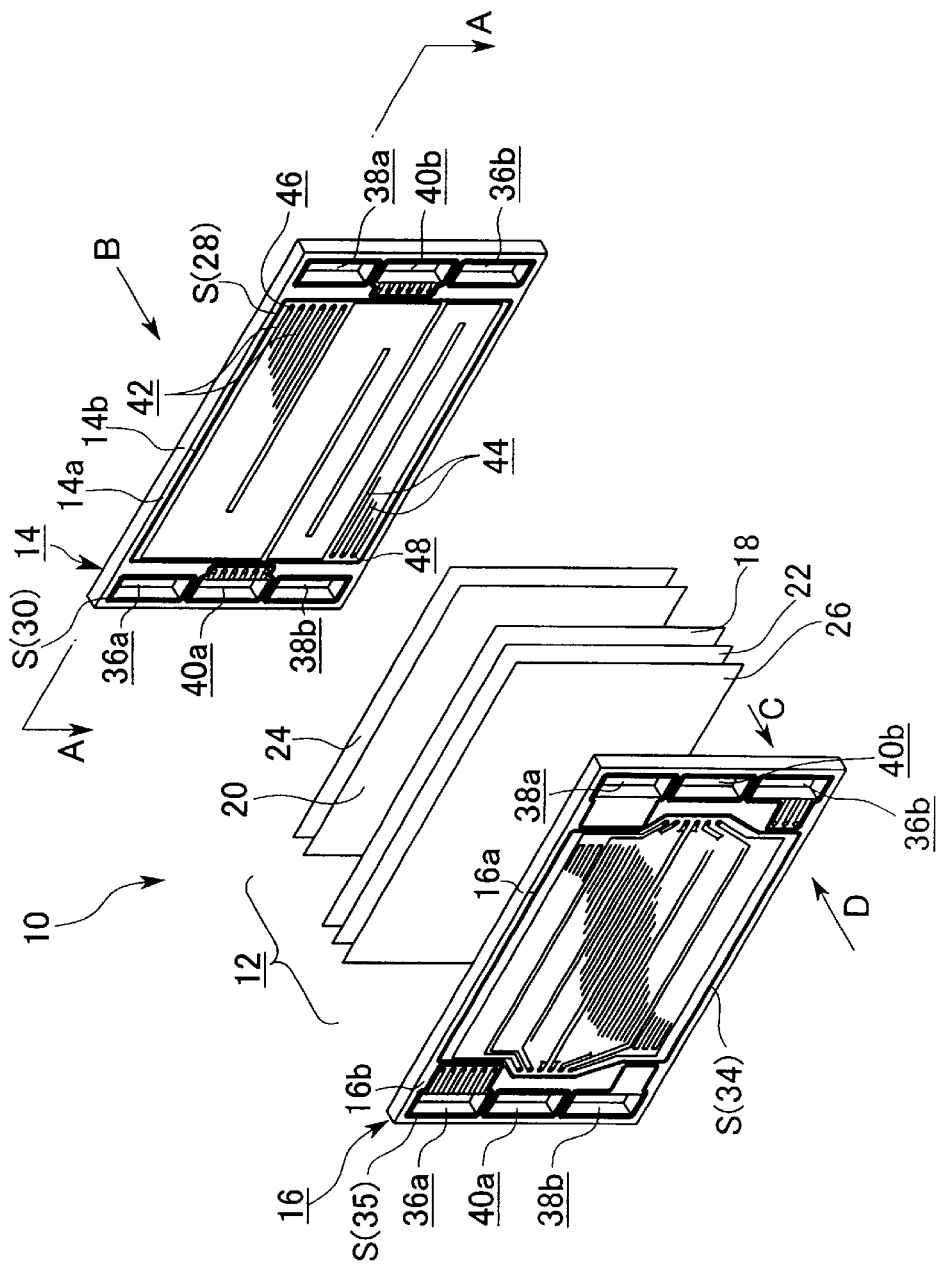
FIG. 1 is an exploded perspective view showing the fuel cell according to a first embodiment of the present invention.

FIG. 1 is an exploded perspective view showing the fuel cell according to a first embodiment of the present invention. The fuel cell unit 10 includes a membrane electrode assembly 12, and a first separator 14 and a second separator 16, which may be made of a dense carbon, for holding the fuel cell unit. A fuel cell stack for a vehicle is assembled by stacking a plurality of the fuel cells 10.

The membrane electrode assembly 12 includes a solid polymer electrolyte membrane 18, and a cathode electrode 20 and an anode electrode 22 which hold both sides of the solid polymer electrolyte membrane 18. The cathode electrode 20 has a first gas diffusion layer 24 and the anode electrode 22 has a second gas diffusion layer 26, and the gas diffusion layers are made of, for example, porous carbon cloth, or porous carbon paper. The solid polymer electrolyte membrane 18 is made of perfluorosulfonic acid polymer in this embodiment. Also, the cathode electrode 20 and the anode electrode 22 are made of Pt. The cathode side diffusion electrode includes the cathode electrode 20 and the first gas diffusion layer 24, while the anode side diffusion electrode includes the anode electrode 22 and the second gas diffusion layer 24.

Figure 6:
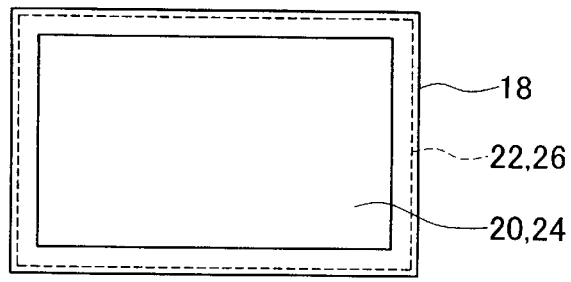
FIG. 6 is a diagram showing a plan view of a membrane electrode assembly used in the first embodiment of the present invention.

The solid polymer electrolyte membrane 18, as shown in FIG. 6, has a margin which slightly projects from the edges of the cathode electrode 20 and the first gas diffusion layer 24, and the edges of the anode electrode 22 and the second gas diffusion layer 26, which hold the solid polymer electrolyte membrane 18. Accordingly, the surface area of the anode electrode 22 and the second gas diffusion layer 26 is smaller than that of the solid polymer electrolyte membrane 18, and the surface area of the cathode electrode 20 and the first gas diffusion layer 24 is smaller than that of the anode electrode 22 and the second gas diffusion layer 26. Also, the cathode electrode 20 and the first gas diffusion layer 24 are concentric with the anode electrode 22 and the second gas diffusion layer 26. Moreover, the size of the cathode electrode 20 and the first gas diffusion layer 24, and the size of the anode electrode 22 and the second gas diffusion layer 26 are adjusted so that the proportion of the size thereof in the vertical and horizontal directions in FIG. 6 becomes equal.

Figure 3:
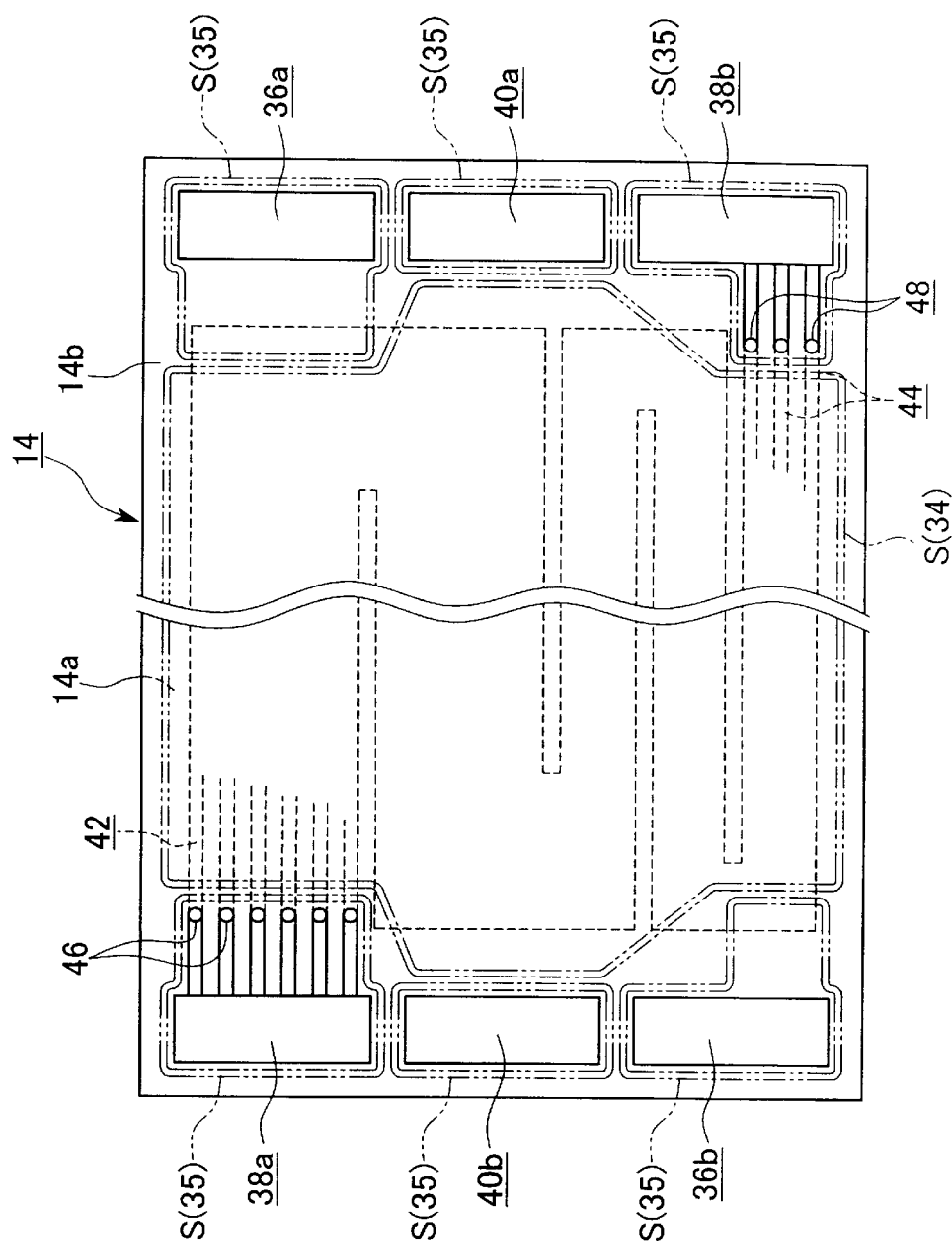
FIG. 3 is a diagram showing a first separator used in embodiments of the present invention viewed from the direction indicated by the arrow B shown in FIG. 1.

As shown in FIG. 3, in this embodiment, the first separator 14 has an inlet side fuel gas opening 36a for allowing a fuel gas, such as a gas containing hydrogen, to pass through, at the upper right end close to the edge thereof, and an inlet side oxidant gas opening 38a for allowing an oxidant gas, such as a gas containing oxygen, or air, to pass through, at the upper left end close to the edge thereof.

An inlet side coolant opening 40a which allows a coolant, such as pure water, ethylene glycol, or oil, to pass through is provided at the right end in the horizontal direction and in the middle in the vertical direction of the first separator 14. An outlet side coolant opening 40b which allows the used coolant to pass through is provided at the left end in the horizontal direction and in the middle in the vertical direction of the first separator 14.

Also, an outlet side fuel gas opening 36b for allowing the fuel gas to pass through is provided at the lower left end of and close to the edge of the first separator 14, and is disposed diagonally with respect to the inlet side fuel gas opening 36a. An outlet side oxidant gas opening 38b for allowing the oxidant gas to pass through is provided at the lower right end of and close to the edge of the first separator 14, and is disposed diagonally with respect to the inlet side oxidant gas opening 38*a*.

As shown in FIG. 1, a plurality of, for example, six, independent first oxidant gas channels 42 are formed on a surface 14*a* opposite the cathode electrode 20 of the first separator 14. They start in the vicinity of the inlet side oxidant gas opening 38*a*, and run horizontally while meandering downward in the direction of gravity. These first oxidant gas channels 42 merge into three second oxidant gas channels 44, and the second oxidant gas channels 44 end in the vicinity of the outlet side oxidant gas opening 38*b*.

As shown in FIG. 3, the first separator 14 has first oxidant gas connecting passages 46 which pass through the first separator 14, whose ends are connected to the inlet side oxidant gas opening 38*a* on a surface 14*b* opposite the surface 14*a*, and whose other ends are connected to the first oxidant gas channels 42 on the surface 14*a*. Further, the first separator 14 has second oxidant gas connecting passages 48 which pass through the first separator 14, whose ends are connected to the outlet side oxidant gas opening 38*b* on the surface 14*b*, and whose other ends are connected to the second oxidant gas channels 48 on the surface 14*a*.

Figure 4:
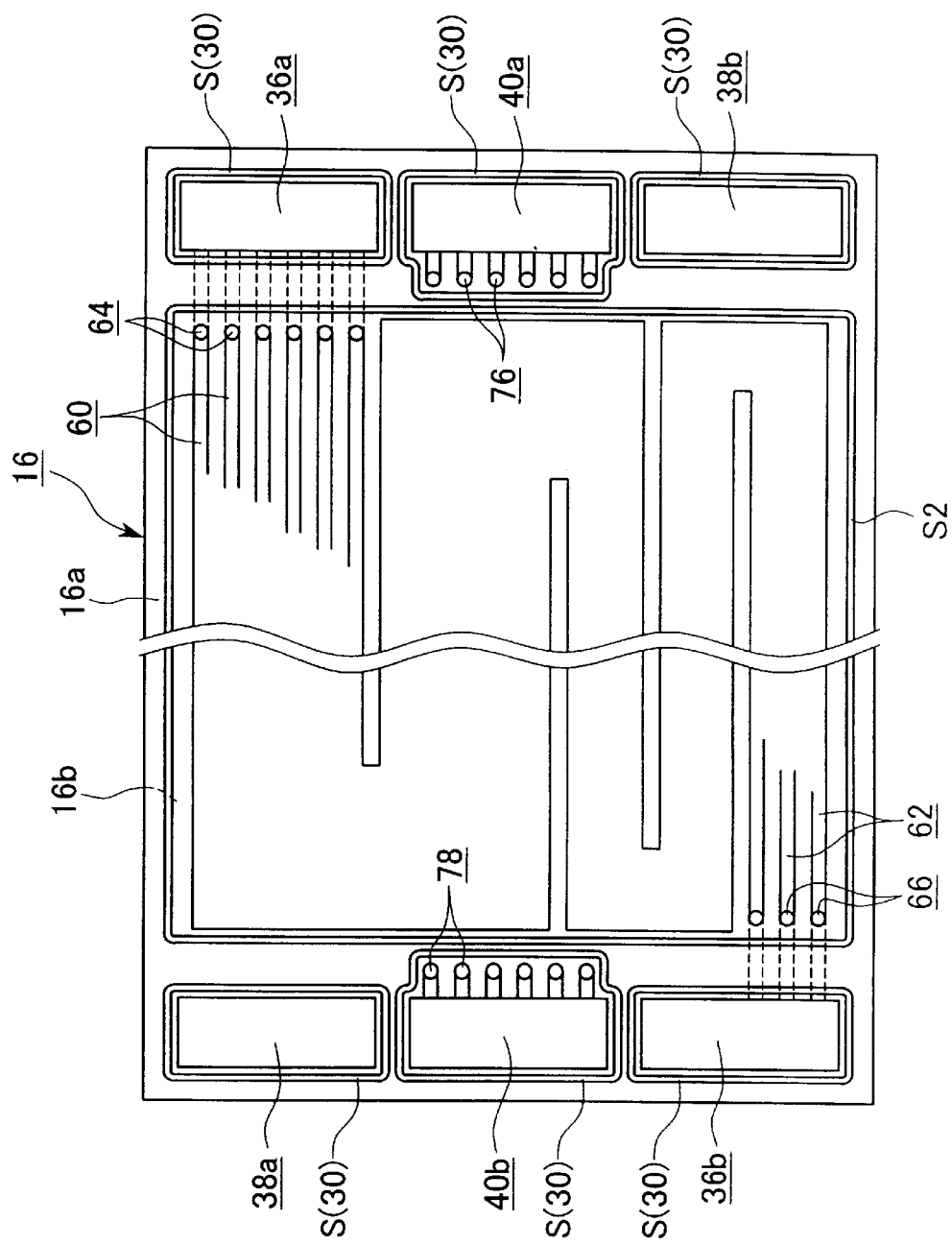
FIG. 4 is a diagram showing a second separator used in the embodiments of the present invention viewed from the direction indicated by the arrow C shown in FIG. 1.
Figure 5:
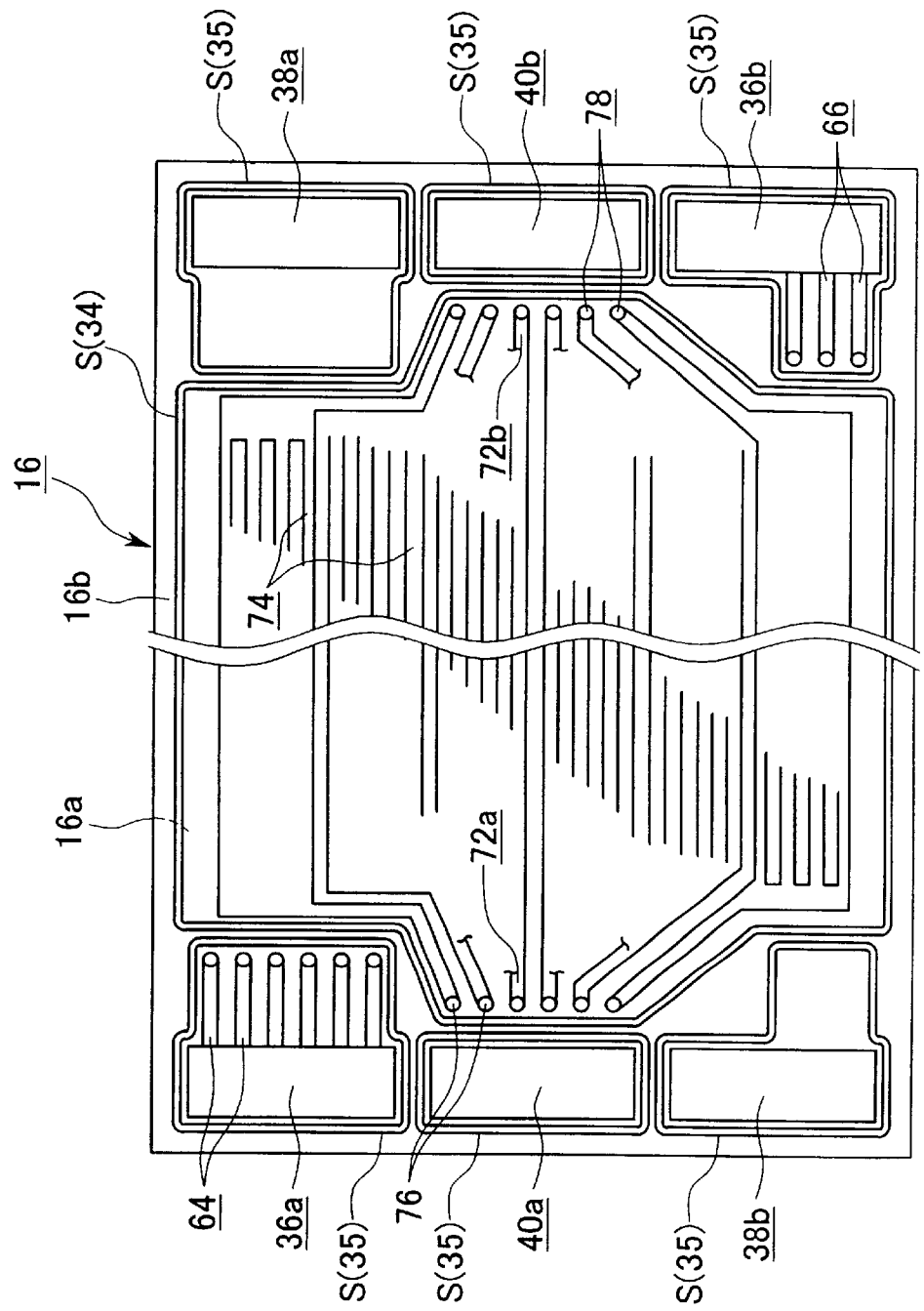
FIG. 5 is a diagram showing a separator used in the embodiments of the present invention viewed from the direction indicated by the arrow D shown in FIG. 1.

As shown in FIGS. 4 and 5, an inlet side fuel gas opening 36*a*, an inlet side oxidant gas opening 38*a*, an inlet side coolant opening 40*a*, an outlet side coolant opening 40*b*, an outlet side fuel gas opening 36*b*, and an outlet side oxidant gas opening 38*b*, are located at both ends of and close to the edges of the second separator 16, in a manner similar to the openings of the first separator 14.

A plurality of, for example, six, first fuel gas channels 60 are formed on a surface 16*a* of the second separator 16, and they start in the vicinity of the inlet side fuel gas opening 36*a*. The first fuel gas channels 60 run horizontally while meandering downward in the direction of gravity, and merge into three second fuel gas channels 62. The second fuel gas channels 62 end in the vicinity of the outlet side fuel gas opening 36*b*.

Also, the second separator 16 has first fuel gas connecting passages 64 which connect the inlet side fuel gas opening 36*a* on the surface 16*b* to the first fuel gas channels 60, and second fuel gas connecting passages 66 which connect the outlet side fuel gas opening 36*b* on the surface 16*b* to the second fuel gas channels 62. The passages 64 and 66 pass through the second separator 16.

Figure 2:
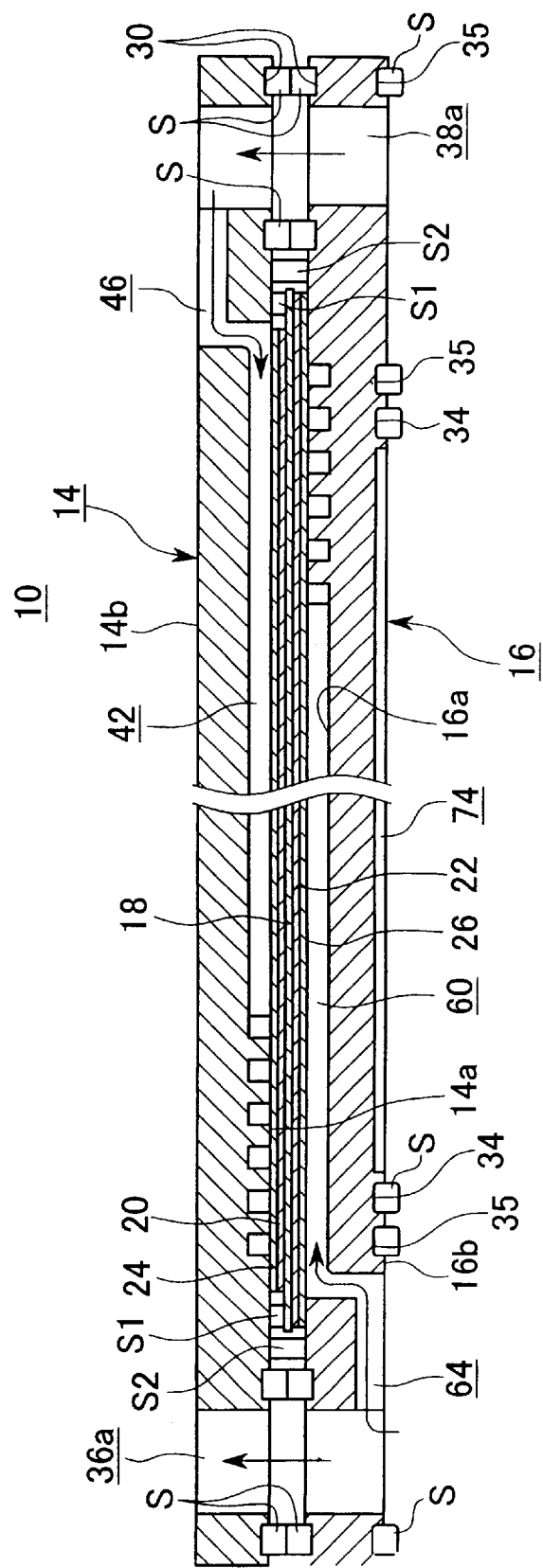
FIG. 2 is a cross-sectional view of the fuel cell shown in FIG. 1 cut along the A—A line.

As shown in FIGS. 2 and 5, a plurality of main channels 72*a* and 72*b* which act as coolant channels are formed on the surface 16*b* of the second separator 16, within the area enclosed by a seal S which will be described later, and close to the inlet side coolant opening 40*a* and the outlet side coolant opening 40*b*. A plurality of branch channels 74 branch off from the main channels 72*a* and 72*b*, and extend in the horizontal direction.

The second separator 16 has first coolant connecting passages 76 which connect the inlet side coolant opening 40*a* to the main channels 72*a*, and second coolant connecting passages 78 which connect the outlet side coolant opening 40*b* to the main channels 72*b*. The passages 76 and 78 pass through the second separator 16.

As shown in FIG. 4, a groove 30 is formed around each of the inlet side fuel gas opening 36*a*, the inlet side oxidant gas opening 38*a*, the inlet side coolant opening 40*a*, the outlet side coolant opening 40*b*, the outlet side fuel gas opening 36*b*, and the outlet side oxidant gas opening 38*b*, which are formed on the surface 16*a* of the separator 16. The seal S is applied to the groove 30. The grooves 30 around the inlet side coolant opening 40*a* and the outlet side coolant opening 40*b* are formed so as to surround each of the first coolant connecting passage 76 and the second coolant connecting passage 78.

Also, as shown in FIG. 5, a groove 35 is formed around each of the inlet side fuel gas opening 36*a*, the inlet side oxidant gas opening 38*a*, the inlet side coolant opening 40*a*, the outlet side coolant opening 40*b*, the outlet side fuel gas opening 36*b*, and the outlet side oxidant gas opening 38*b*, which are formed on the surface 16*b* of the separator 16. The seal S is also applied to the groove 35. The grooves 35 around the inlet side fuel gas opening 36*a* and the outlet side fuel gas opening 36*b* are formed so as to surround each of the first fuel gas connecting passage 64 and the second fuel gas connecting passage 66. Also, the groove 35 around the inlet side oxidant gas opening 38*a* and the outlet side oxidant gas opening 38*b* are formed so as to surround each of the inlet side oxidant gas opening 38*a* and the outlet side oxidant gas opening 38*b*, on the surface 14*b* of the first separator 14.

Moreover, as shown in FIGS. 2 and 3, a first seal S1 is applied to the face 14*a* of the first separator 14 so as to surround the first oxidant gas channels 42 and the second oxidant gas channels 44 and make contact with the solid polymer electrolyte membrane 18 and surround the cathode electrode 20.

Further, a second seal S2 is applied to the surface 14*a* of the first separator 14 so as to surround the above-mentioned first seal S1 so that the second seal S2 makes contact with the surface 16*a* of the second separator 16 to surround the anode electrode 22.

Figure 7:
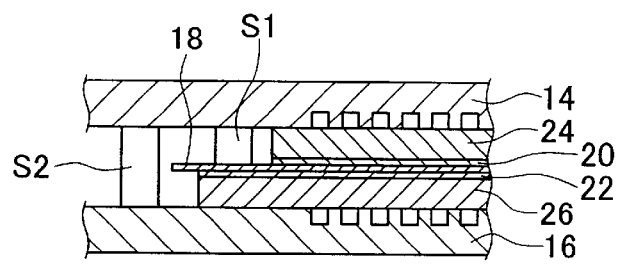
FIG. 7 is a schematic diagram showing a cross-sectional view of a main portion of the first embodiment according to the present invention shown in FIG. 2.

Accordingly, as shown in FIGS. 2 and 7, when the membrane electrode assembly 12 is held by the first separator 14 and the second separator 16, the seals S applied to the groove 30, which is formed around each of the inlet side fuel gas opening 36*a*, the inlet side oxidant gas opening 38*a*, the inlet side coolant opening 40*a*, the outlet side coolant opening 40*b*, the outlet side fuel gas opening 36*b*, and the outlet side oxidant gas opening 38*b*, which are formed on the surface 16*a* of the second separator 16, contact each other. Accordingly, the circumferences of the above-mentioned inlet side fuel gas opening 36*a*, the inlet side oxidant gas opening 38*a*, the inlet side coolant opening 40*a*, the outlet side coolant opening 40*b*, the outlet side fuel gas opening 36*b*, and the outlet side oxidant gas opening 38*b* are sealed by the seal S. Also, the periphery of the membrane electrode assembly 12 may be sealed with certainty by the first seal S1 and the second seal S2.

As shown in FIG. 5, a groove 34 encloses the branch channels 74 on the surface 16*b* of the second separator 16, opposite the surface 14*b* of the first separator 14 when a plurality of fuel cells unit 10 are stacked. The seal S is put into the groove 34.

When the fuel cell units 10 are stacked and the surface 14*b* of the first separator 14 contacts the surface 16*b* of the second separator 16, the seals S of the second separator 16 arranged around the inlet side fuel gas opening 36*a*, the inlet side oxidant gas opening 38*a*, the inlet side coolant opening 40*a*, the outlet side coolant opening 40*b*, the outlet side fuel gas opening 36*b*, the outlet side oxidant gas opening 38*b*, and the branch channels 74 are in contact with the surface 14*b* of the first separator 14, thereby ensuring water-tightness between the first separator 14 and the second separator 16.

In this embodiment, all of the above-mentioned seals S, the first seal S1, and the second seal S2 may be formed by a silicone rubber (for instance, one having a hardness of about 50°). Although the seals S, S1, and S2 may be adhesive or non-adhesive, it is preferable to use one non-adhesive as the seal S which is used, for instance, between the surface 14b of the first separator 14 and the surface 16b of the second separator 16.

The operation of the fuel cell according to the first embodiment of the present invention will be explained as follows.

A fuel gas, for example, a gas which contains hydrogen obtained by reforming hydrocarbons, is supplied to the fuel cell unit 10, while an oxidant gas, for example, air or a gas which contains oxygen, (hereinafter simply referred to as air) is supplied to the fuel cell unit 10. Also, a coolant is supplied to cool down the electrically active surface. As shown in FIG. 2, the fuel gas is supplied into the inlet side fuel gas opening 36a, flows from the surface 16b through the first fuel gas connecting passages 64 to the surface 16a, and reaches the first fuel gas channels 60 on the surface 16a.

The fuel gas supplied to the first fuel gas channels 60 runs horizontally while meandering downward on the surface 16a of the second separator 16 in the direction of gravity. During this travel, the hydrogen gas in the fuel gas is supplied to the anode side electrode 22 of the fuel cell unit 10 via the second gas diffusion layer 26. The fuel gas moves through the first fuel gas channels 60 to be supplied to the anode side electrode 22. Then, the fuel gas is introduced through the second fuel gas channels 62 into the second fuel gas connecting passage 66, reaches the surface 16b, and is discharged through the outlet side fuel gas opening 16b shown in FIG. 1.

Also, the air supplied into the inlet side oxidant gas opening 38a in the fuel cell stack is introduced through the first oxidant gas connecting passages 46, which connect to the inlet side oxidant gas opening 38a formed on the first separator 14, into the first oxidant gas channels 42. While the air supplied into the first oxidant gas channels 42 moves horizontally while meandering downward in the direction of gravity, the oxygen-containing gas in the air is supplied through the first gas diffusion layer 24 to the cathode side electrode 20. On the other hand, the gas which has not yet been used is discharged through the second oxidant gas channels 44, the second oxidant gas connecting passages 48, and the outlet side oxidant gas opening 38b shown in FIG. 1. In this manner, electric energy is generated by the fuel cell, and is supplied to a motor which is not shown in the figures.

Further, the coolant supplied to the fuel cell is introduced into the inlet side coolant opening 40a, shown in FIG. 1, and is supplied through the first coolant connecting passages 76 of the second separator 16 to the main channels 72a on the surface 16b as shown in FIG. 5. The coolant travels through a plurality of branch channels 74 branched from the main channels 72a while cooling down the electrically active surface of the fuel cell unit 10, and reaches the main channels 72b. Then, the used coolant is discharged through the second coolant connecting passages 78, and the outlet side coolant opening 40b.

According to the above embodiment, the periphery of the cathode electrode 20 and the first gas diffusion layer 24 may be sealed with certainty by the first seal S1, which is provided between the surface 14a of the first separator 14 and the anode electrode 22 via the solid polymer electrolyte membrane 18. Also, the periphery of the anode electrode 22 and the second gas diffusion layer 26 may be sealed with certainty by the second seal S2, which is provided between the surface 14a of the first separator 14 and the surface 16a of the second separator 16. Accordingly, the first seal S1 and the second seal S2 may function independently of each other. Thus, as compared with a case in which a sealing function is achieved by compressing two O-rings against each other, problems such as deficiencies in the sealing force caused by a positional shift may be eliminated and, hence, a seal of the membrane electrode assembly and the separators may be assured.

Also, although only members made of the same kind of material can be used in order to equalize the reaction force when they are positioned opposite each other, such an effect of the reaction force need not be considered according to the present invention and the material to be used may be freely selected.

Moreover, the first seal S1 does not generate a force which causes twisting of the solid polymer electrolyte membrane 18, and the second seal S2 does not make contact with the membrane electrode assembly 12. Accordingly, a force in a detachment direction is not applied to the solid polymer electrolyte membrane 18.

Further, since it is not necessary to place the first seal S1 and the second seal S2 so as to correspond to each other, it becomes easy to control the dimensional accuracy. Accordingly, it becomes easy to handle the first and the second seals S1 and S2, and the manufacturing costs thereof may be reduced.

In addition, since the cross-sectional area of the second seal S2 may be increased, the elastic deformation degree thereof may also be increased and its sealing property may be improved.

Next, the second embodiment according to the present invention will be described with reference to FIG. 8.

The second embodiment of the present invention differs from the first embodiment in that the surface area of the anode electrode 22 and the second gas diffusion layer 26 is larger than that of the solid polymer electrolyte membrane 18, i.e., the solid polymer electrolyte membrane 18 is formed with a surface area smaller than that of the anode electrode 22 and the second gas diffusion layer 26 (i.e., either the anode side diffusion electrode or the cathode side diffusion electrode, whichever has a larger surface area). Similar to the above-mentioned first embodiment, a seal is provided with certainty by the first seal S1 and the second seal S2 in this embodiment. Note that the same numerals are used for denoting the same parts in the first embodiment and the explanation thereof is omitted. According to the second embodiment of the present invention, since the part of the solid polymer electrolyte membrane 18 which is not covered by the second gas diffusion layer 26 becomes unnecessary, the size of the solid polymer electrolyte membrane 18, which is relatively expensive, may be decreased and, hence, the costs for manufacturing the solid polymer electrolyte membrane 18 may be reduced.

Next, the third embodiment of the present invention will be described with reference to FIG. 9.

According to the third embodiment, the first seal S1 is disposed between the surface 14a of the first separator 14 and the anode electrode 22 via the solid polymer electrolyte membrane 18. The seal S1 is disposed so as to make contact with the end faces of the cathode electrode 20 and the first gas diffusion layer 24. According to this embodiment, it becomes possible to prevent the reaction gas from leaking from the end faces of the cathode electrode 20 and the first gas diffusion layer 24. Also, it becomes possible to prevent the reaction gas from passing through to the outlet side without making contact with the power generation surface. Moreover, the sealing property thereof may further be improved.

Next, the fourth embodiment according to the present invention will be described with reference to FIG. 10.

In the fourth embodiment, the first seal S1 is placed in a position similar to the position in the third embodiment and the second seal S2 is placed so as to make contact with the end faces of the first seal S1, the anode electrode 22 and the second gas diffusion layer 26. According to the fourth embodiment, it becomes possible to prevent with certainty gases from leaking out the end faces of the cathode 20 and the first gas diffusion layer 24 and the end faces of the anode electrode 22 and the second gas diffusion layer 26. Also, it becomes possible to prevent the reaction gas from passing through to the outlet side without making contact with the power generation surface. Moreover, the sealing property thereof may further be improved.

Figure 11:
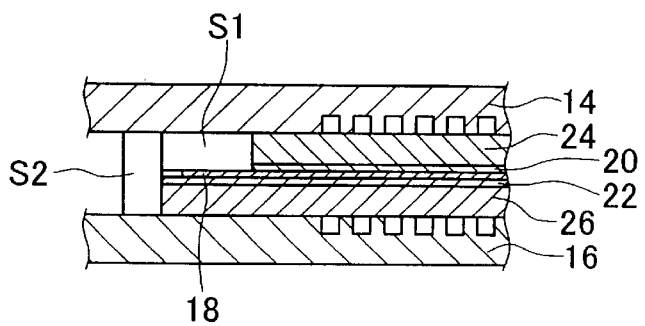
FIG. 11 is a diagram showing a cross-sectional view of a fifth embodiment according to the present invention which corresponds to FIG. 7.

Next, the fifth embodiment according to the present invention will be described with reference to FIG. 11.

In the fifth embodiment, the first seal S1 is extended in the face direction of the cathode electrode 20 and the first gas diffusion layer 24 so that it covers a portion of the anode electrode 22 and the second gas diffusion layer 26 not covered by the cathode electrode 20 and the first gas diffusion layer 24 so that no space is present between the first seal S1 and the second seal S2. Since no space is present between the first seal S1 and the second seal S2, and the first seal S1 and the second seal S2 make contact when laminated, no unnecessary pressure is applied to a sealed portion by expansion/contraction of the space due to changes in temperature.

According to the fifth embodiment, it becomes possible, as in the above-mentioned fourth embodiment, to prevent with certainty gases from leaking out from the end faces of the cathode electrode 20 and the first gas diffusion layer 24 and the end faces of the anode electrode 22 and the second gas diffusion layer 26. Also, the sealing property thereof may further be improved. Moreover, since no space is present between the first seal S1 and the second seal S2, no unnecessary pressure is applied to a sealed portion by expansion/contraction of the space due to changes in temperature. Further, the anode electrode 22 and the second gas diffusion layer 26 may be supported with certainty by the first seal S1.

Figure 12:
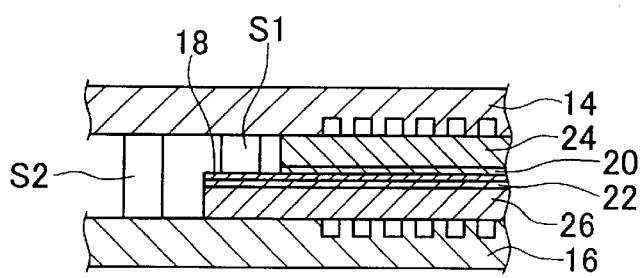
FIG. 12 is a diagram showing a cross-sectional view of a sixth embodiment according to the present invention which corresponds to FIG. 7.

Next, the sixth embodiment according to the present invention will be described with reference to FIG. 12.

In this embodiment, the size of the solid polymer electrolyte membrane 18 of the first embodiment shown in FIG. 7 is made equal to the size of the anode electrode 22 and the second gas diffusion layer 26.

Although it may appear difficult to place two members of the same size to produce the structure shown in the figure, the solid polymer electrolyte membrane 18, the anode electrode 22, and the second gas diffusion layer 26 may be assembled together first and then the edge portions thereof may be cut to be flush with each other. Thus, if the positions of the solid polymer electrolyte membrane 18, the anode electrode 22, and the second gas diffusion layer 26 are initially offset a little, such an offset in position can eventually be corrected. Hence, this is advantageous for the manufacturing process. Also, since the positioning of the solid polymer electrolyte membrane 18, the anode electrode 22, and the second gas diffusion layer 26 may be carried out accurately as mentioned above, the size of the fuel cell produced may be decreased.

Figure 13:
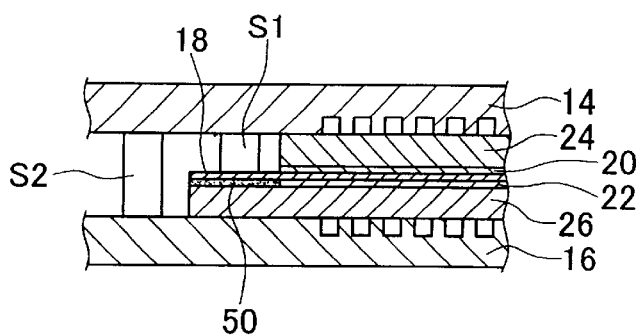
FIG. 13 is a diagram showing a cross-sectional view of a seventh embodiment according to the present invention which corresponds to FIG. 7.

Next, the seventh embodiment according to the present invention will be described with reference to FIG. 13.

Figure 8:
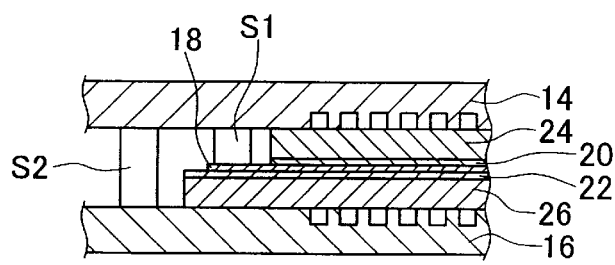
FIG. 8 is a diagram showing a cross-sectional view of a second embodiment according to the present invention which corresponds to FIG. 7.

In this embodiment, the size of the anode electrode 22 of the second embodiment shown in FIG. 8 is made equal to the size of the cathode electrode 20. In this embodiment, since the amount of electrode material (i.e., a catalyst portion) may be reduced, its manufacturing cost may be decreased.

Also, in this embodiment, an adhesive composition 50 is applied to a portion which is occupied by a part of the anode electrode 22 in the second embodiment, so that the solid polymer electrolyte membrane 18 may be adhered to the second gas diffusion layer 26 by the adhesive composition 50. Accordingly, the space generated by removing the part of the anode electrode 20 is filled by the adhesive composition 50 so that it becomes possible to prevent the solid polymer electrolyte membrane 18 from being bent at this portion and, hence to prevent the solid polymer electrolyte membrane 18 from being separated from that portion.

Next, the eighth embodiment according to the present invention will be described with reference to FIG. 14.

The fuel cell in this embodiment includes a membrane electrode assembly 12 (i.e., a membrane electrode assembly) and a first separator 114 and a second separator 116, which may be made of a thin metal plate of, for instance, stainless steel, and which hold the membrane electrode assembly 12. A plurality of these are laminated to form a fuel cell stack for a vehicle. Note that the fuel cells according to the ninth through eleventh embodiments of the present invention which will be described later, also include separators made of a metal.

Figure 14:
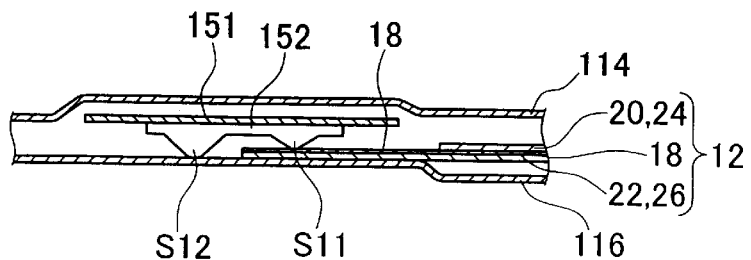
FIG. 14 is a diagram showing a cross-sectional view of an eighth embodiment according to the present invention which corresponds to FIG. 7.

As shown in FIG. 14, the membrane electrode assembly 12 includes the solid polymer electrolyte membrane 18, the cathode electrode 20, and the anode electrode 22. As in the above-explained embodiments, the first gas diffusion layer 24 and the second gas diffusion layer 26, which may be made of porous carbon cloth or porous carbon paper, are provided with the cathode electrode 20 and the anode electrode 22, respectively. In this embodiment, the solid polymer electrolyte membrane 18 is made of perfluorosulfonic acid polymer. Also, both the cathode electrode 20 and the anode electrode 22 are made mainly of platinum (Pt).

The size of the solid polymer electrolyte membrane 18 is made equal to the size of the anode electrode 22 and the second gas diffusion layer 26. The surface area of the cathode 20 and the first gas diffusion layer 24 are made smaller than the surface area of the anode electrode 22 and the second gas diffusion layer 26.

Also, the first separator 114 and the second separator 116 are disposed on the outer surface of the first gas diffusion layer 24 and the second gas diffusion layer 26, respectively. In this embodiment, a bridge portion 151 (a separator) which introduces the reaction gas is provided with the first separator 114 and a first seal S11 located at the inner side and a second seal S12 located at the outer side are integrally formed with the bridge portion 151. Also, the first seal S11 and the second seal S12 have a common base portion 152 which is integrally formed.

Note that although the above-mentioned bridge portion 151 is shown as being separate from the first separator 114 in the figure, the two are formed as one body in practice. The first seal S11 makes contact with the anode electrode 22 and the second gas diffusion layer 26 via the solid polymer electrolyte membrane 18, and the second seal S12 makes contact with the second separator 116.

Accordingly, in this embodiment also, the first seal S11 and the second seal S12 may function independently since the surroundings of the anode electrode 22 and the second gas diffusion layer 26 may be sealed with certainty by the first seal S11 and the second seal S12. Therefore, as compared with the case in which the seal is obtained by pressing two O-rings against each other, problems such as deficiencies in sealing force caused by positional shifts may be eliminated and, hence, the seal may be assured.

Also, the first seal S11 does not generate a force which may cause twisting of the solid polymer electrolyte membrane 18. Moreover, the second seal S12 does not make contact with the membrane electrode assembly 12. Accordingly, there is no force acting in the direction separating the solid polymer electrolyte membrane 18. Further, since it is not necessary to place the first seal S11 and the second seal S12 so as to correspond to each other, it becomes easy to control the dimensional accuracy thereof. Thus, it becomes easy to handle the first and second seals S11 and S12, and the manufacturing costs thereof may be reduced.

In addition, since the separators 114 and 116 are formed by a metal in this embodiment, they may be produced easily by using a press molding method. Also, the manufacturing costs thereof may be reduced. Moreover, since the first seal S11 and the second seal S12 are integrally formed at the same side, they can be readily manufactured, and the number of manufacturing processes may be decreased.

Figure 15:
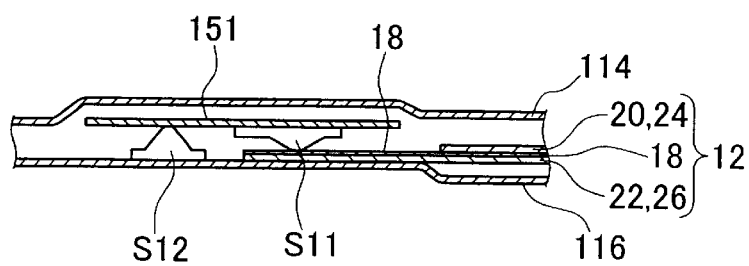
FIG. 15 is a diagram showing a cross-sectional view of a ninth embodiment according to the present invention which corresponds to FIG. 7.

Next, the ninth embodiment according to the present invention will be described with reference to FIG. 15. In this embodiment, the same numerals are used for denoting the same parts in the previous embodiments and the explanation thereof will be omitted (hereinafter the same applies to the rest of the embodiments).

In the ninth embodiment, the second seal S12 in the eighth embodiment is separated from the first seal S11 and attached to the bridge portion 151 of the above-mentioned first separator 114.

According to this embodiment, in addition to the basic effect obtained in the above embodiment, the design range of the first seal S11 and the second seal S12 may be increased since they may be produced by using different materials.

Figure 16:
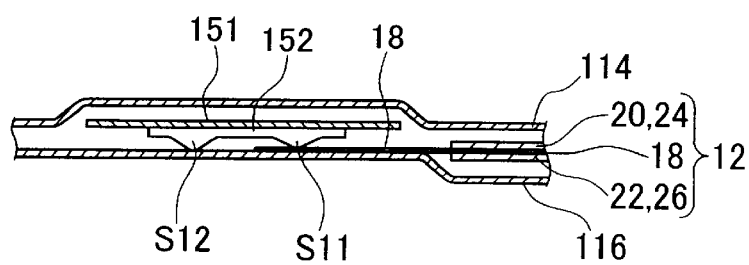
FIG. 16 is a diagram showing a cross-sectional view of a tenth embodiment according to the present invention which corresponds to FIG. 7.

Next, the tenth embodiment according to the present invention will be described with reference to FIG. 16.

In this embodiment, both the first seal S11 and the second seal S12 are disposed outside of the circumference of the anode electrode 22 and the second gas diffusion layer 26 and the cathode electrode 20 and the first gas diffusion layer 24.

More specifically, the size of the cathode 20 and the first gas diffusion layer 24 are made equal to the size of the anode electrode 22 and the second gas diffusion layer 26, and the size of the solid polymer electrolyte membrane 18 is made larger than the size of the first gas diffusion layer 24 and the second gas diffusion layer 26. Also, the solid polymer electrolyte membrane 18, which is held between the cathode electrode 20 (the first gas diffusion layer 24 ) and the anode electrode 22 (the second gas diffusion layer 26), is disposed on the second separator 116. The size of the first seal S11 and the second seal S12 are made equal and have an integrally formed common base portion 152. The first seal S11 makes contact with the solid polymer electrolyte membrane 18, and the second seal S12 makes contact with the separator 116.

According to this embodiment, in addition to the effect obtained in the eighth embodiment, the manufacturing costs may be reduced since the sizes of the first gas diffusion layer 24 and the second gas diffusion layer 26 are reduced. Also, a double sealing effect may be obtained with respect to the reaction gas inside the first seal S11 and, hence, safety may be improved by reducing the possibility of leakage of the reaction gas.

Figure 17:
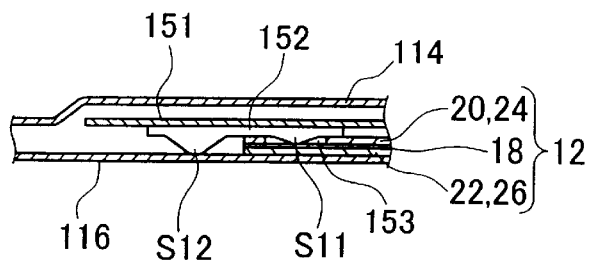
FIG. 17 is a diagram showing a cross-sectional view of an eleventh embodiment according to the present invention which corresponds to FIG. 7.

Next, the eleventh embodiment according to the present invention will be described with reference to FIG. 17.

In this embodiment, each of the cathode electrode 20, the first gas diffusion layer 24, the anode electrode 22, the second gas diffusion layer 26, and the solid polymer electrolyte membrane 18 has the same size. Also, a groove 153 is formed in the vicinity of the circumference of the second gas diffusion layer 26 so as to expose the solid polymer electrolyte membrane 18. That is, the groove 153, which exposes the solid polymer electrolyte membrane 18, is formed on the second gas diffusion layer 26, but not on its circumference portion. The first seal S11 and the second seal S12 having a common base portion 152 are integrally formed and attached to the bridge portion 151. The first seal S11 is inserted in the groove 153 and makes contact with the solid polymer electrolyte membrane 18. The second seal S12 makes contact with the second separator 116.

According to this embodiment, since it is possible to compress the front face of the solid polymer electrolyte membrane 18 from both sides, it becomes possible to prevent the generation of cracks in the solid polymer electrolyte membrane 18 even if the water content of the solid polymer electrolyte membrane 18 is changed and the membrane 18 expands or contracts.

Figure 18:
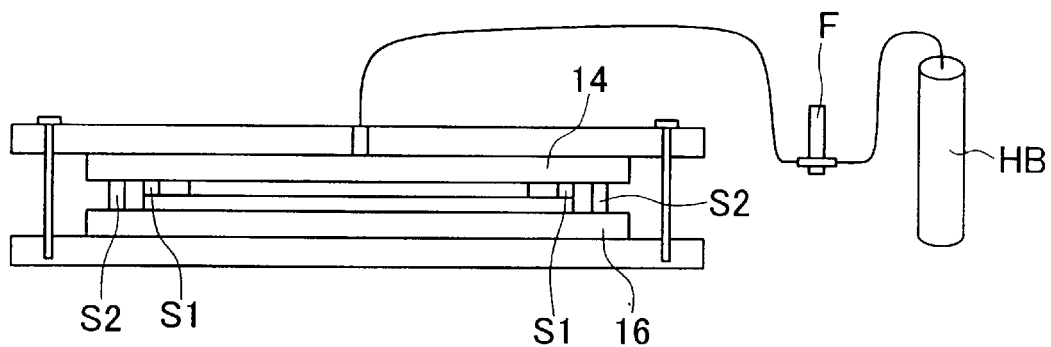
FIG. 18 is a diagram for explaining a leak test device used for testing the fuel cells according to the present invention.

FIG. 18 is a diagram showing a leak testing device. Testing carried out by using the leak testing device measured the amount of helium gas leaking outside of a sealing portion using a flowmeter F where the first separator 14 and the second separator 16 holding the membrane electrode assembly 12 were clamped by a bolt and helium gas was supplied from a helium bomb HB to the reaction gas passages at the center of the first separator 14. The test was performed under the conditions of 1N/mm of joint load; a measurement temperature of 20–24° C.; and a gas pressure of 200 kPa.

Figure 9:
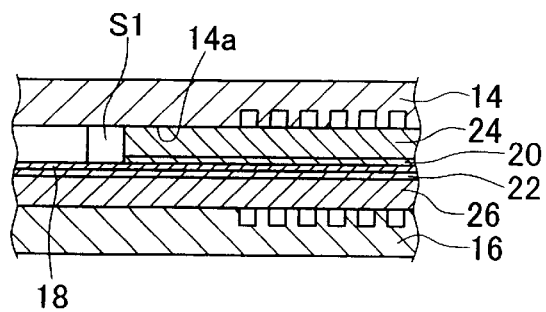
FIG. 9 is a diagram showing a cross-sectional view of a third embodiment according to the present invention which corresponds to FIG. 7.
Figure 10:
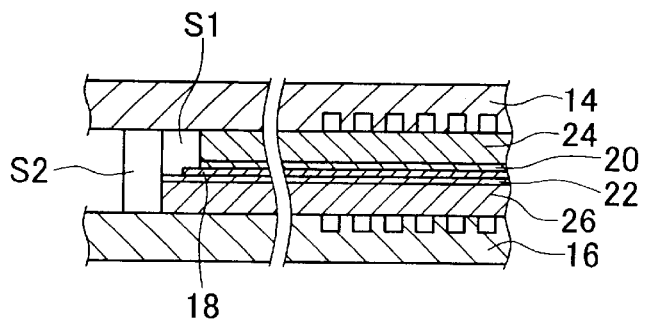
FIG. 10 is a diagram showing a cross-sectional view of a fourth embodiment according to the present invention which corresponds to FIG. 7.

Sample 1 having the structure of the first embodiment shown in FIGS. 1–7, Sample 2 having the structure of the second embodiment shown in FIG. 8, Sample 3 having the structure of the third embodiment shown in FIG. 9, and Sample 4 having the structure of the fourth embodiment shown in FIG. 10, in each of which the solid polymer electrolyte membrane 18 was held by the first seal S1 and the second seal S2, were prepared and used for the test. FIG. 18 also shows the situation where the test was performed on Sample 2. Note that a separator made of stainless steel was used for Samples 1–4 for convenience in carrying out the test.

The leak test was carried out for three categories, namely, initial stage; thermal cycle (–40° C./1 hr–90° C./1 hr); and high temperature durability (90° C.). The results are shown in Table 1 below.

TABLE 1

| Sample No. | Initial | Thermal cycle (–40° C./1 hr-90° C./1 hr) | High Temp. Durability (90° C.) |
| --- | --- | --- | --- |
| 1 | 0 cc/min | 0 cc/min(1,000 cycle) | 0 cc/min(1,000 hr.) |
| 2 | 0 cc/min | 0 cc/min(1,000 cycle) | 0 cc/min(1,000 hr.) |
| 3 | 0 cc/min | 0 cc/min(1,000 cycle) | 0 cc/min(1,000 hr.) |
| 4 | 0 cc/min | 0 cc/min(1,000 cycle) | 0 cc/min(1,000 hr.) |

As is obvious from the test results, no leak of helium gas was observed for Samples 1–4 for all three categories.

Accordingly, the allowable range of positional shift of the first seal S1 and the second seal S2 may be increased and the tolerance zones for positioning the upper and the lower seals may also be increased. Accordingly, the present invention has advantages in production engineering.

Figure 19:
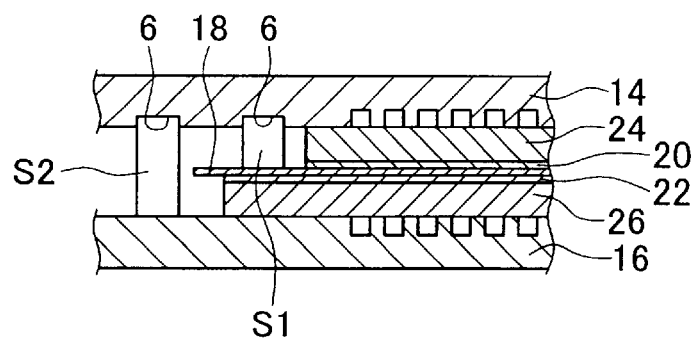
FIG. 19 is a diagram showing a cross-sectional view of another embodiment according to the present invention which corresponds to FIG. 7.
Figure 20:
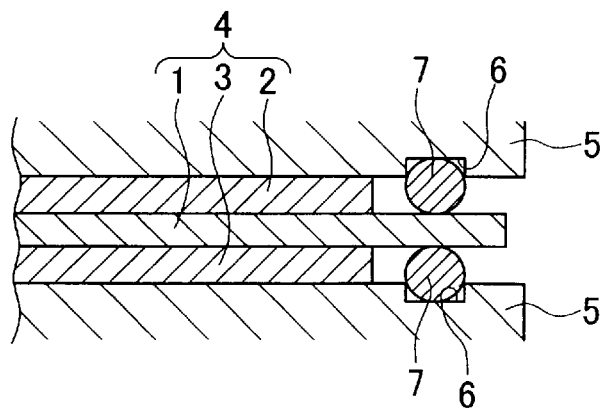
FIG. 20 is a diagram showing a cross sectional view of a conventional fuel cell.

Note that the present invention is not limited to the above-mentioned embodiments and, for instance, a part of the first seal S1 and the second seal S2 may be inserted in the groove portions 6 as shown in FIG. 19. In this structure, the position of the first seal S1 and the second seal S2 may be easily determined and the cross sectional area of seals S1 and S2 may be increased. Also, in other embodiments, the first seal S1 may be pre-attached to the first separator 14, or the second seal S2 may be pre-attached to either the first separator 14 or the second separator 16.

In addition, grooves may be eliminated on the seals S which have been applied to the grove portions 30 around each of the inlet side fuel gas opening 36a, the inlet side oxidant gas opening 38a, the inlet side coolant opening 40a, the outset side coolant opening 40b, the outset side fuel gas opening 36b, and the outlet side oxidant gas opening 38b.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A fuel cell including a membrane electrode assembly having a solid polymer electrolyte membrane, an anode side diffusion electrode and a cathode side diffusion electrode located at both sides of the solid polymer electrolyte membrane, and a pair of separators which holds the membrane electrode assembly, comprising:
   a first seal substantially disposed between one of said separators and a periphery portion of whichever of said anode side diffusion electrode and said cathode side diffusion electrode has the larger surface area, said first seal being disposed so as to surround whichever of said anode side diffusion electrode and said cathode side diffusion electrode has the smaller surface area; and
   a second seal substantially disposed between said separators so as to surround whichever of said anode side diffusion electrode and said cathode side diffusion electrode has the larger surface area.

2. A fuel cell according to claim 1, wherein
   the size of said solid polymer electrolyte membrane is smaller than the size of whichever of said anode side diffusion electrode and said cathode side diffusion electrode has the larger surface area.

3. A fuel cell according to claim 1, wherein
   at least one of said first seal and said second seal makes contact with an end face of said anode side diffusion electrode or an end face of said cathode side diffusion electrode.

4. A fuel cell according to claim 1, wherein
   said first seal makes contact with an end face of whichever of said anode side diffusion electrode and said cathode side diffusion electrode has the smaller surface area; and
   said first seal being extended so as to cover whichever of said anode side diffusion electrode and said cathode side diffusion electrode has the larger surface area.

5. A fuel cell according to claim 4, wherein
   said second seal makes contact with both an end face of said first seal and an end face of whichever of said anode side diffusion electrode and said cathode side diffusion electrode has the larger surface area.

6. A fuel cell according to claim 1, wherein
   the size of said solid polymer electrolyte membrane and the size of whichever of said anode side diffusion electrode and said cathode side diffusion electrode has the larger surface area are substantially the same.

7. A fuel cell according to claim 1, wherein
   said anode side diffusion electrode comprises an anode electrode, which is a catalyst portion, and a diffusion layer; and
   said cathode side diffusion electrode comprises a cathode electrode, which is a catalyst portion, and a diffusion layer, wherein
   the size of said catalyst portion of said anode side diffusion electrode and the size of said catalyst portion of said cathode side diffusion electrode are substantially the same.

8. A fuel cell according to claim 1, wherein said separators are made of dense carbon.

9. A fuel cell according to claim 1, wherein said separators are made of a thin metal plate.

10. A fuel cell according to claim 9, wherein said first seal and said second seal are provided with the same one of said separators.

11. A fuel cell according to claim 9, wherein each of said first seal and said second seal is provided with a different one of said separators.

12. A fuel cell including a membrane electrode assembly having a solid polymer electrolyte membrane, an anode side diffusion electrode and a cathode side diffusion electrode located at both sides of the solid polymer electrolyte membrane, and a pair of separators which holds the membrane electrode assembly, comprising:
   a first seal substantially disposed between one of said pair of separators and said membrane electrode assembly; and
   a second seal substantially disposed between said pair of separators so as to be shifted in position outwardly with respect to the position of said first seal to form a double seal together with said first seal.

13. A fuel cell including a membrane electrode assembly having a solid polymer electrolyte membrane, an anode side diffusion electrode and a cathode side diffusion electrode located at both sides of the solid polymer electrolyte membrane, and a pair of separators which holds the membrane electrode assembly, comprising:
   a groove portion provided with said anode side diffusion electrode or said cathode side diffusion electrode, said groove portion being so formed to expose said solid polymer electrolyte membrane;
   a first seal provided with one of said separators, said first seal being inserted in said groove portion so as to make contact with said solid polymer electrolyte membrane; and
   a second seal provided with one of said separators, said second seal being shifted in position outwardly with respect to the position of said first seal and making contact with the other one of said separators.

14. A fuel cell according to claim 13, wherein said anode side diffusion electrode and said cathode side diffusion electrode are of the same size.

15. A fuel cell according to claim 13, wherein said first seal and said second seal are provided with the same one of said separators.

16. A fuel cell according to claim 13, wherein each of said first seal and said second seal is provided with a different one of said separators.

* * * * *